United States Patent
Nakano (10) Patent No.: US 7,756,076 B2
(45) Date of Patent: Jul. 13, 2010

(54) CELLULAR MOBILE COMMUNICATION SYSTEM HAVING ADJACENT BASE STATIONS EACH USING SAME FREQUENCY FOR COMMUNICATION BETWEEN BASE STATION AND MOBILE TERMINALS

(75) Inventor: Hiroyuki Nakano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 536 days.

(21) Appl. No.: 11/429,002

(22) Filed: May 5, 2006

(65) Prior Publication Data

US 2007/0177539 A1     Aug. 2, 2007

(30) Foreign Application Priority Data

Jan. 31, 2006    (JP)    .............................. 2006-023082

(51) Int. Cl.
  *H04W 4/00*    (2009.01)
(52) U.S. Cl. ....................... 370/328; 370/346; 370/350; 370/332; 455/522
(58) Field of Classification Search .................. 370/328
  See application file for complete search history.

(56) References Cited

U.S. PATENT DOCUMENTS

| 6,266,537 | B1 | 7/2001 | Kashitani et al. |
| 6,359,874 | B1* | 3/2002 | Dent ........................... 370/342 |
| 7,212,540 | B2* | 5/2007 | Unitt et al. ................... 370/452 |
| 2002/0107013 | A1 | 8/2002 | Fitzgerald |
| 2002/0131376 | A1 | 9/2002 | Wheatley et al. |
| 2004/0233867 | A1 | 11/2004 | Wheatley et al. |
| 2005/0157695 | A1 | 7/2005 | Stephens et al. |

FOREIGN PATENT DOCUMENTS

| CA | 2360983 | 1/2003 |
| DE | 4238295 | 5/1994 |
| WO | 02054617 | 7/2002 |

OTHER PUBLICATIONS

Extended European Search Report and Annex to the Extended European Search Report dated May 31, 2007 for corresponding European Application EP 06 25 2424.

* cited by examiner

*Primary Examiner*—Rafael Pérez-Gutiérrez
*Assistant Examiner*—German Viana Di Prisco
(74) *Attorney, Agent, or Firm*—Katten Muchin Rosenman LLP (57) ABSTRACT

The invention provides a cellular mobile communication system that efficiently performs high-speed communication with mobile terminals within the cell using a single frequency. The mobile communication system sequentially performs polling communication control to plural terminals within the own cell, based on a control of a base station positioned near the center of the cell. With this arrangement, the terminals within the cell can communicate with each other using a single frequency.

6 Claims, 8 Drawing Sheets

CELLULAR MOBILE COMMUNICATION SYSTEM HAVING ADJACENT BASE STATIONS EACH USING SAME FREQUENCY FOR COMMUNICATION BETWEEN BASE STATION AND MOBILE TERMINALS

BACKGROUND OF THE INVENTION

1. Field of the Invention

The present invention relates to a cellular mobile communication system. Particularly, the invention relates to a mobile communication system that communicates with a mobile terminal within a cell using a single frequency.

2. Description of the Related Art

According to a conventional cellular mobile communication system, divided into n cells to avoid radio interference with adjacent cells. The same frequency band is repeatedly used in each of the n cells, thereby avoiding radio interference with adjacent cells. However, according to this system, a frequency band that can be simultaneously used in adjacent cells becomes 1/n, and a satisfactory communication speed cannot be obtained.

In this case, when the same frequency is used in adjacent cells, a terminal near a base station that is positioned at the center of a cell can communicate with other terminal, without receiving radio interference from other station. However, a terminal positioned far from the center of the cell cannot communicate satisfactorily with other terminal, because of radio interference from the adjacent cells.

Therefore, according to a conventional technique, in a cellular communication using a time division multiple access (TDMA) system, frequency utilization efficiency can be improved by allocating a channel to an idle time slot, as disclosed in Japanese Patent Application Unexamined Publication No. 11-88939, for example.

However, in the above example, the technique is limited to the use of a time slot according to the TDMA system, and the technique cannot be applied to a more general cellular communication system such as a frequency division multiplex access (FDMA) system.

SUMMARY OF THE INVENTION

In the light of the above problems, it is an object of the present invention to provide a cellular mobile communication system that can improve the frequency utilization efficiency of the system, using various methods.

Specifically, the invention provides a mobile communication system that enables each mobile terminal to use the whole given frequency band (using a single frequency) when necessary, without dividing the given frequency band into n parts. Further, the mobile communication system minimizes a problem of radio interference with the periphery that occurs due to the use of the band.

According to a first aspect of the present invention, there is provided a cellular mobile communication system that sequentially performs polling communication control to plural terminals within an own cell, based on the control of a base station positioned near the center of the cell, thereby making it possible to communicate between the terminals using a single frequency.

According to a second aspect of the present invention, there is provided the cellular mobile communication system according to the first aspect, wherein the base station generates a terminal attribute information table by obtaining terminal attribute information from the terminals at the start of communication, and sequentially performs the polling communication control to the terminals, starting from a terminal positioned nearest to the base station and ending with terminals positioned far from the base station.

According to a third aspect of the present invention, there is provided the cellular mobile communication system according to the second aspect, wherein the base station uses the table and classifies the area of the own cell in which terminals are present, into three concentric areas; a first area that is a first one of the three concentric area, nearest to the base station, a second area that is a second one area far from the base station, and a third area that is the furthest area from the base station and located at the edge. Each base station of adjacent three cells sequentially increases transmission power from the center of the own cell toward the edge, by shifting a phase by 120 degrees, synchronously with other cells, through communications between the stations.

According to a fourth aspect of the present invention, there is provided the cellular mobile communication system according to the third aspect, wherein the base station provides a first threshold value at a boundary between the first area and the second area, further provides a second threshold value at a boundary between the second area and the third area, and performs a communication start terminal control of increasing the transmission power in the adjacent three cells, by using a pointer indicating a start point of the first area or the first or the second threshold value.

According to a fifth aspect of the present invention, there is provided the cellular mobile communication system according to the fourth aspect, wherein, when the number of terminals within the third area exceeds a predetermined number, the base station limits a cell that can use transmission power exceeding the second threshold value, to one cell in which the number of terminals within the third area exceeds the predetermined number, out of the adjacent three cells.

According to the present invention, a terminal that is positioned at the farthest area from the center of a cell can efficiently use a given frequency band without dividing the frequency band, by suppressing radio interference with terminals of adjacent cells.

BRIEF DESCRIPTION OF THE DRAWINGS

The present invention will be more clearly understood from the description as set forth below with reference to the accompanying drawings, wherein.

DETAILED DESCRIPTIONS

Figure 1:
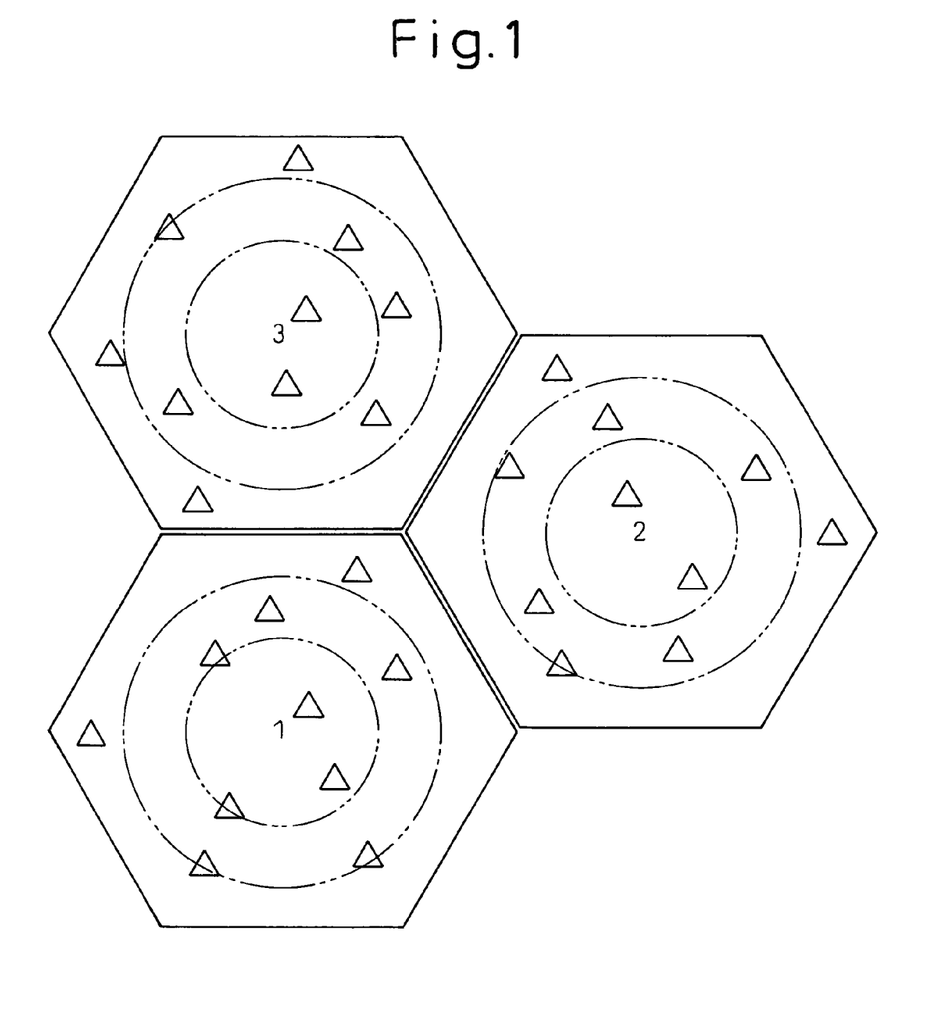
FIG. 1 is an explanatory diagram showing one example of a distribution of terminals in three adjacent cells.
Figure 7:
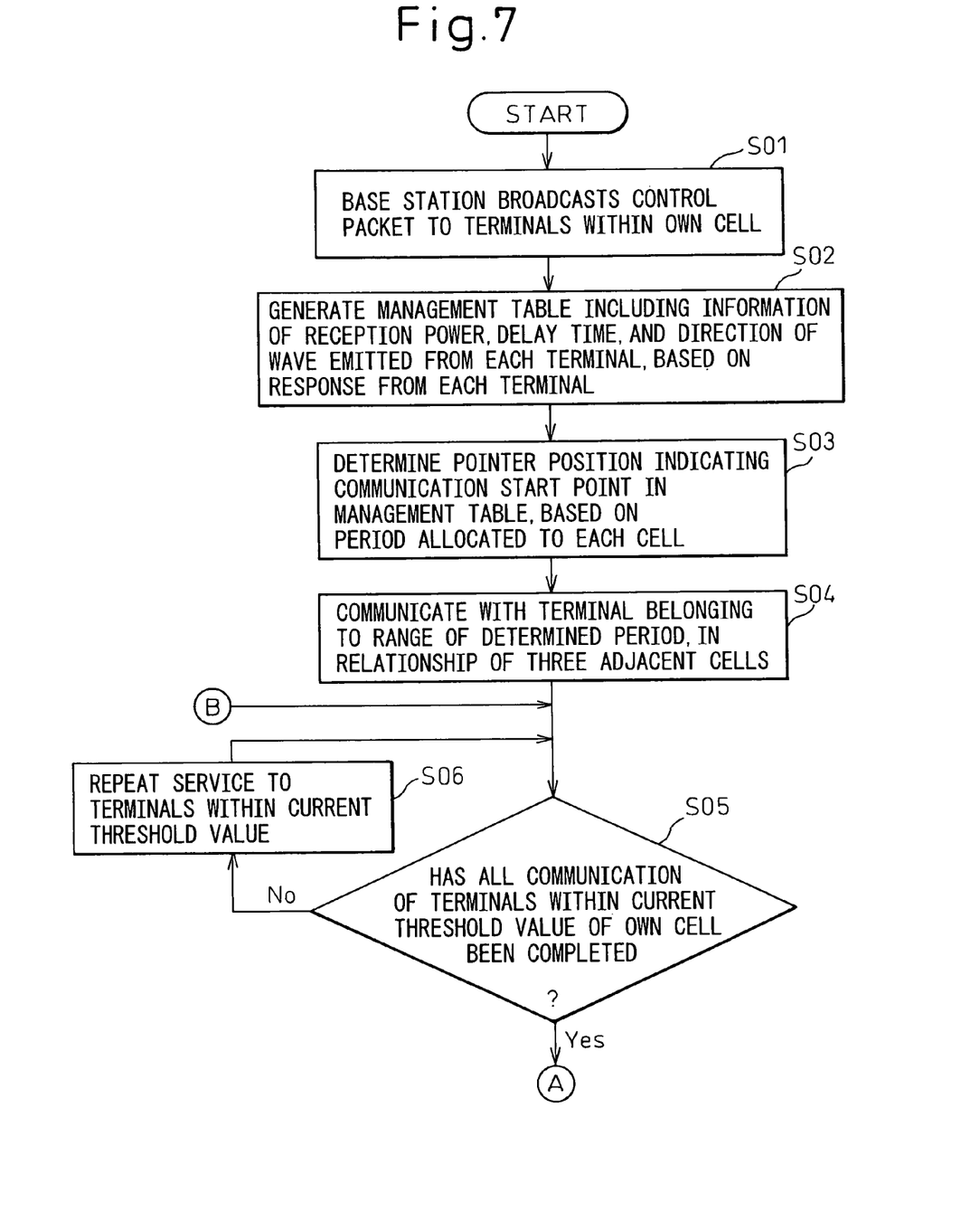
FIG. 7 is a flowchart (1) of one example of a processing flow according to the present invention.
Figure 8:
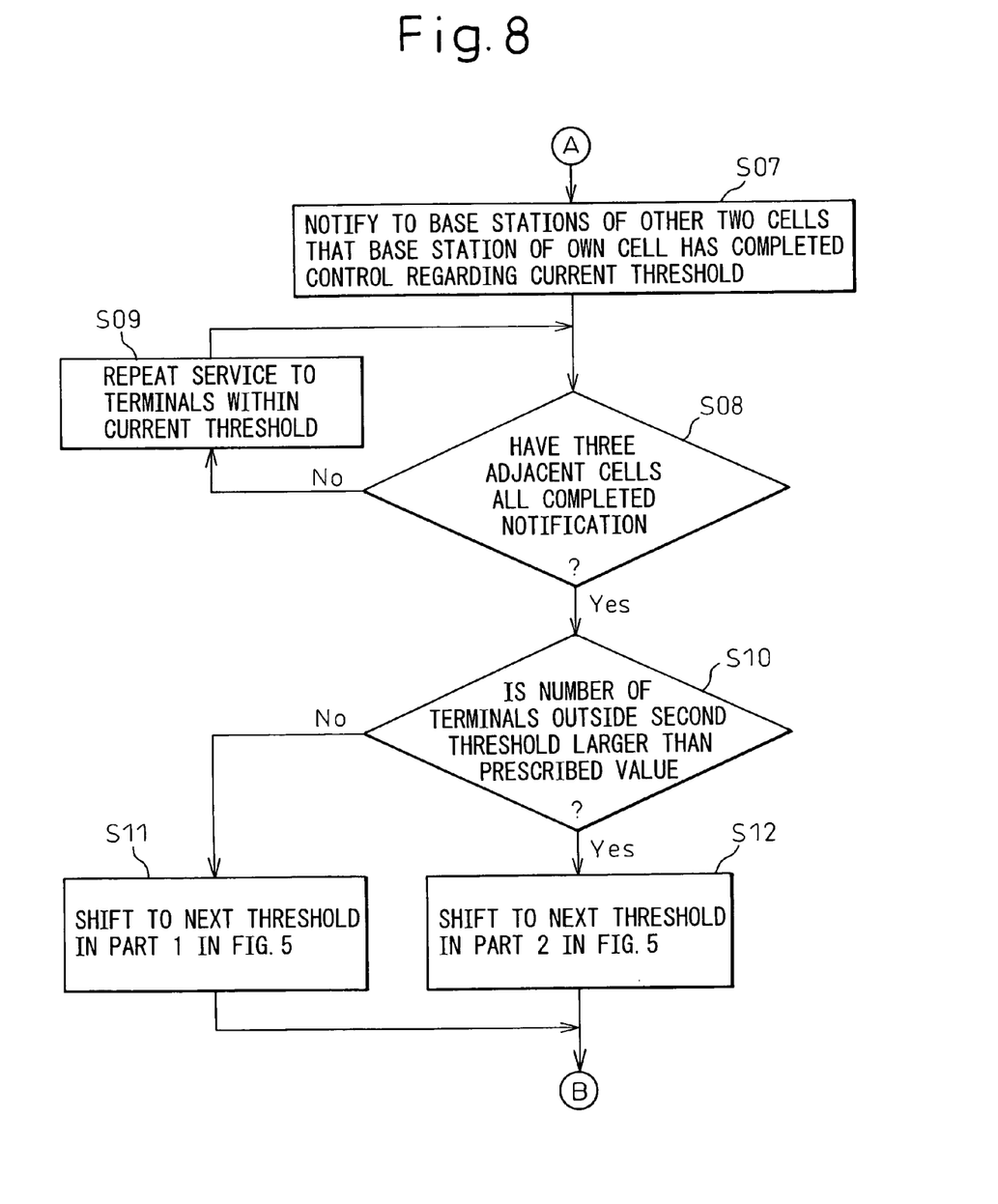
FIG. 8 is a flowchart (2) of one example of a processing flow according to the present invention.

FIG. 1 is an explanatory diagram showing one example of a distribution of terminals in three adjacent cells according to the present invention. FIG. 7 and FIG. 8 show examples of a processing flow according to the present invention. In an explanation of the embodiments, processes corresponding to the processing flows according to the present invention shown in FIG. 7 and FIG. 8 are assigned corresponding step numbers.

A base station is present at the center of each of cells 1 to 3 (the centers are indicated by the cell numbers 1 to 3) in FIG. 1. Each of the cells 1 to 3 is concentrically divided into three areas corresponding to distances from the base station.

Figure 2:
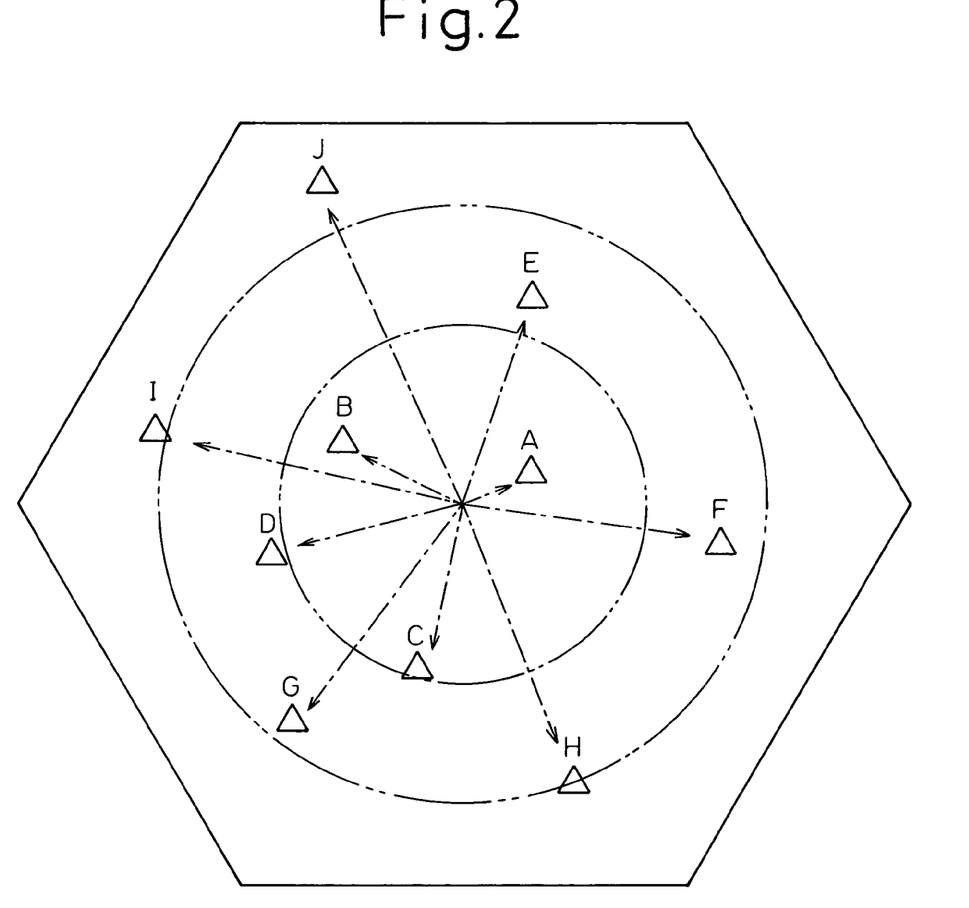
FIG. 2 shows details of a distribution of terminals in one cell.

FIG. 2 shows details of one of the cells shown in FIG. 1. In the present example, terminals A to C are present in a first area nearest to the base station. Terminals D to H are present in the second area. Terminals I and J are present in a third area which is the furthest are from the center of the cell (i.e., the area furthest from the base station and nearest to the adjacent cells; this area receives the largest wave interference from the adjacent cells).

Figure 3:
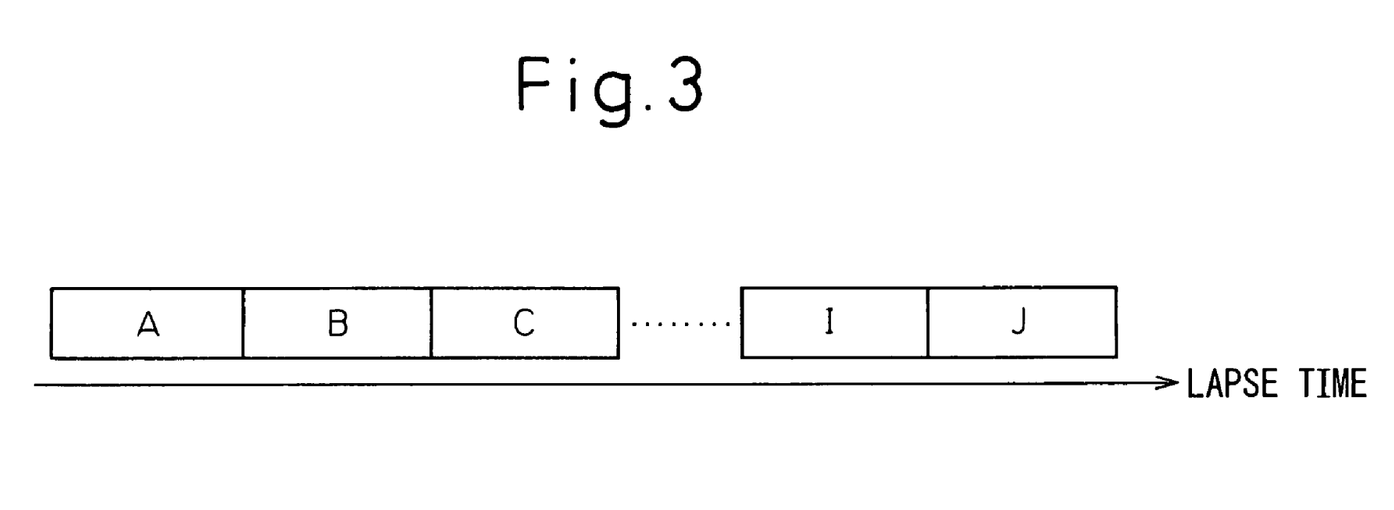
FIG. 3 is an explanatory diagram of an order of access to each terminal from a base station according to a distance in the cell shown in FIG. 2, with an access lapse time shown in a horizontal axis.

FIG. 3 is an explanatory diagram of an order of access to each terminal from the base station according to a distance in each cell, with an access lapse time shown in a horizontal axis. In the example shown in FIG. 2, the base station sequentially accesses the terminals A to J, in the polling order, starting from the terminal A that is nearest the base station to the terminal J that is the furthest from the base station. In this case, the terminals A to J within the same cell do not operate simultaneously. As a result, the terminals do not interfere with each other within the same cell, and each terminal can perform high-speed communication using the same frequency band.

At the time of starting communication, the base station transmits a control broadcast packet to all the terminals A to J within the same cell, to learn the attributes of each terminal (S01). On the other hand, each of the terminals A to J returns response content to the base station, when the base station polls the terminal. The response content includes: a terminal name; reception power; a delay time; and a reception direction. The response content can also include other information such as disconnection information described later. The base station holds the response content in its own table (S02). The base station always keeps the lead in transmitting a downlink frame and in enquiring, of each terminal, about a request for transmitting an uplink frame. Therefore, only one terminal can communicate with the base station within the same cell, at the same time. As a result, each terminal can perform high-speed communication using the whole of a single frequency band.

Figure 4:
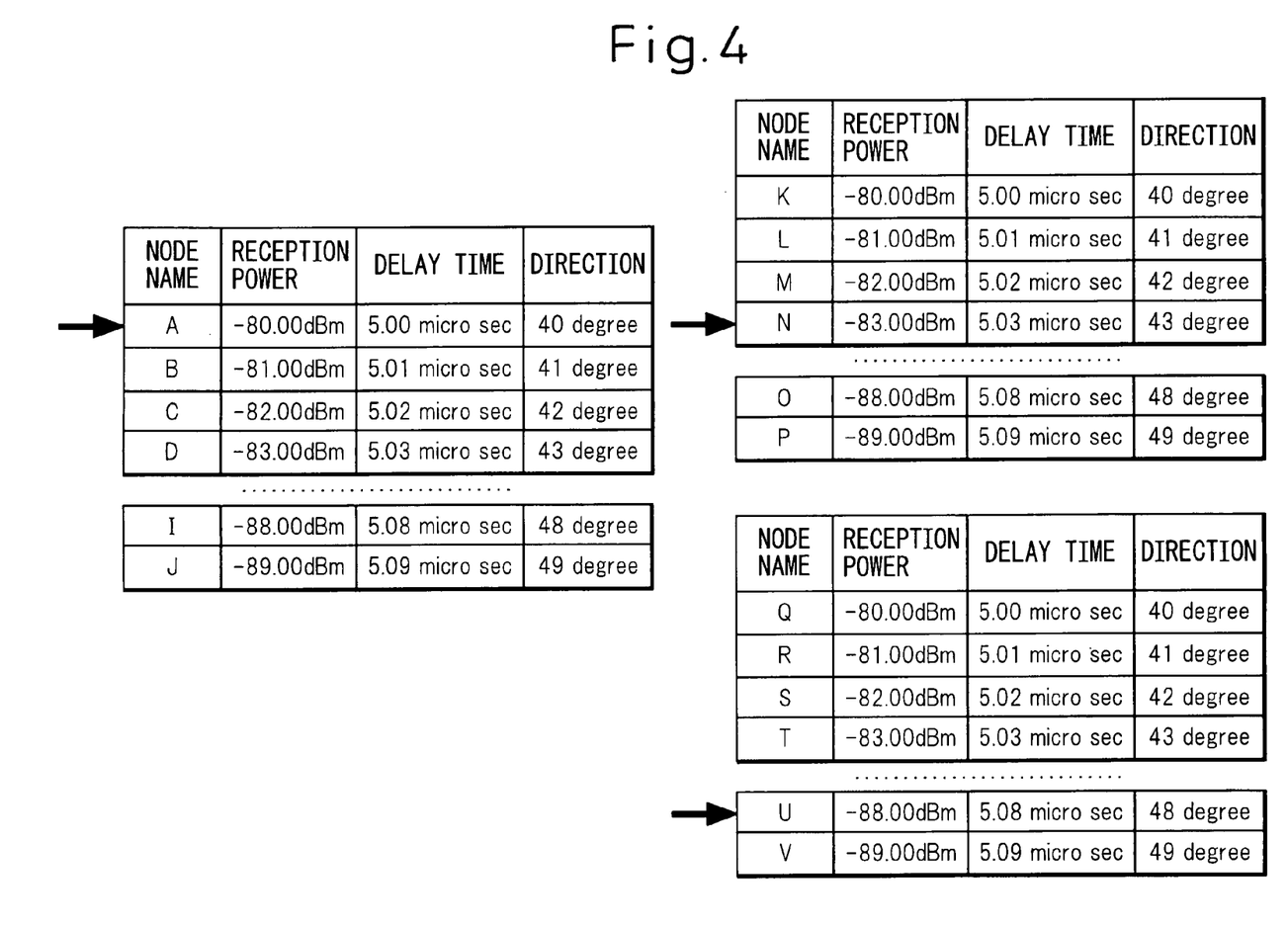
FIG. 4 is an explanatory diagram showing one example of a terminal attribute information table held in the three adjacent base stations.

FIG. 4 shows one example of the above table.

In the present example, response content from each terminal includes a node name, reception power, a delay time, and a direction. FIG. 4 shows a table of response contents of the terminals A to J (see FIG. 2) within the same cell, and tables of response contents of terminals K to P and terminals Q to V (not shown) of the adjacent two cells, respectively. The base station in one cell can obtain the terminal information K to P and Q to V within the two adjacent cells, by communicating with the rest of the base stations.

In FIG. 4, thick arrowheads denote pointers. These pointers indicate a start point of the first area, the second area, and the third area, respectively within each cell (S03). In the present example, a first reception power threshold value at the boundary between the first area and the second area is −83 dB relative to one milliwatt (dBm), and a second reception power threshold value at the boundary between the second area and the third area is −88 dBm.

Therefore, in the present example, within its own cell, polling is started in the terminal A which is nearest in the first area. Within one adjacent cell, polling is started in the terminal N which is nearest in the second area. Within the other adjacent cell, polling is started in the terminal U which is nearest in the third area (S03). As explained above, polling can be started in the first area, the second area, and the third area which are mutually different areas, by synchronizing with the adjacent cells.

Figure 5:
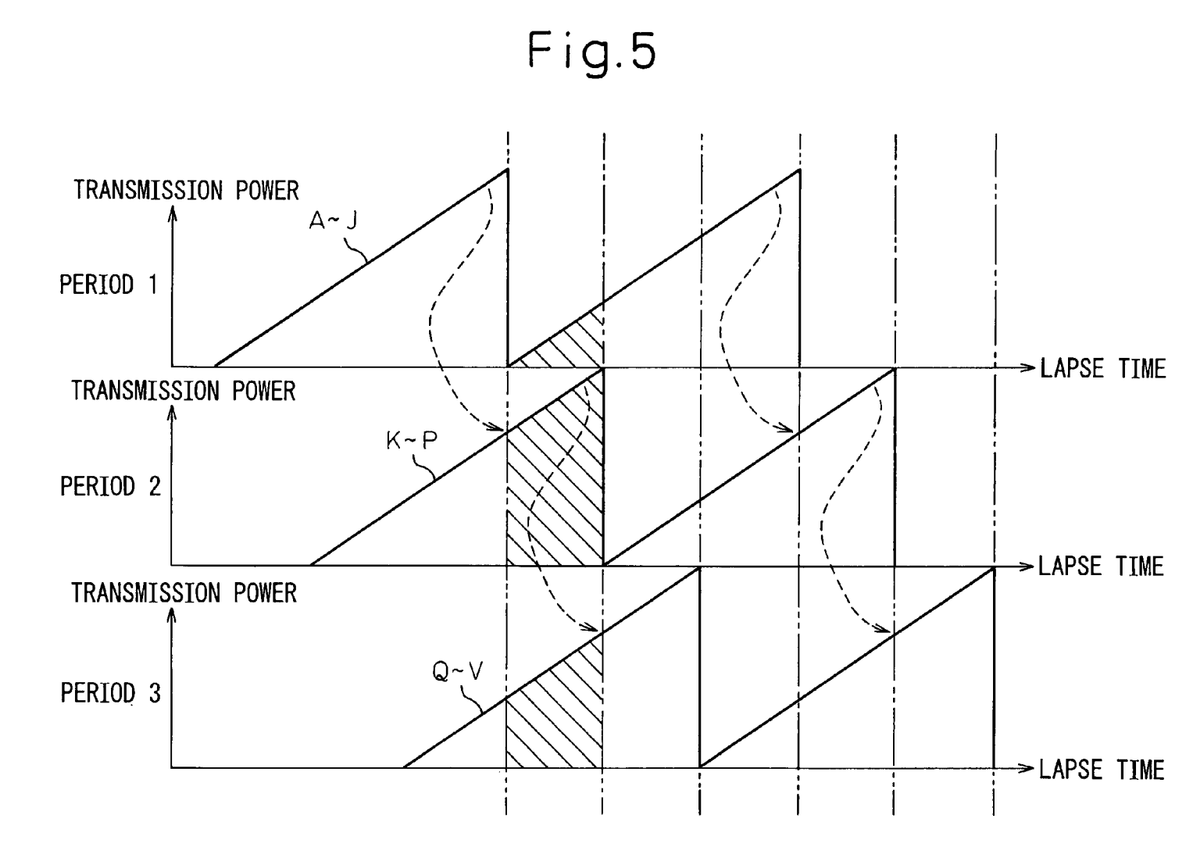
FIG. 5 is an explanatory diagram showing one example (part one) of transmission power control of the three adjacent cells.
Figure 6:
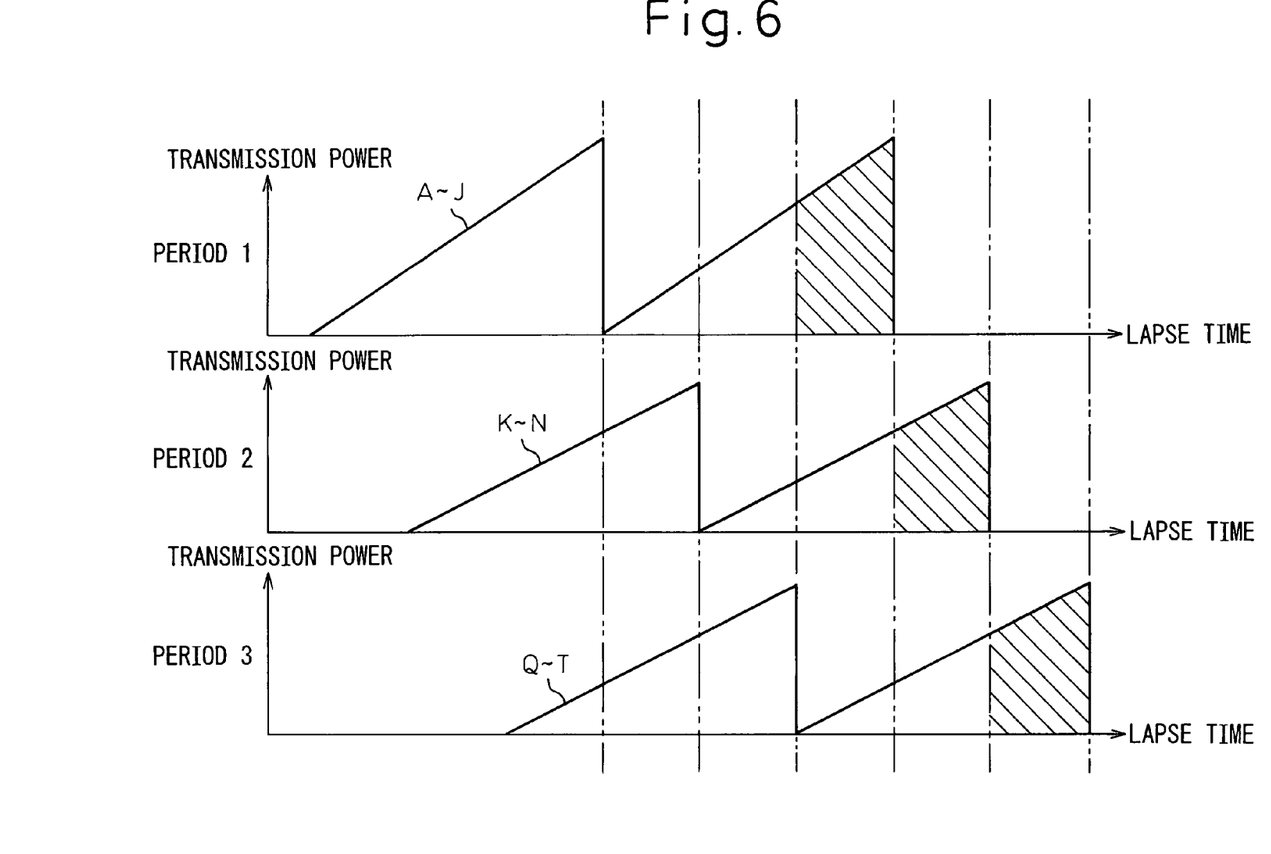
FIG. 6 is an explanatory diagram showing one example (part two) of transmission power control of the three adjacent cells.

FIG. 5 is an explanatory diagram showing one example (part one) of transmission power control of the three adjacent cells. FIG. 6 is an explanatory diagram showing one example (part two) of transmission power control of the three adjacent cells.

In FIG. 5, a period 1 shows one example of transmission power control performed by the base station of the own cell (see the terminals A to J in FIG. 4). A period 2 shows one example of transmission power control performed by the base station of other one cell (see the terminals K to P in FIG. 4). A period 3 shows one example of transmission power control performed by the base station of the other cell (see the terminals Q to V in FIG. 4).

Each base station increases transmission power from the center toward the edge of each cell, for the terminals (i.e., the terminals A to J, the terminals K to P, and the terminals Q to V) arranged in the order of distance from the center of each cell. In this case, each terminal communicates with a terminal having a phase shift of 120 degrees, which is one third of the whole 360 degrees), in the adjacent three cells (S04). As shown by shaded parts in FIG. 5, because a cell in which transmission power momentarily becomes a maximum (i.e., wave interference between adjacent cells occurs easily when the reception power becomes equal to or larger than the second reception power threshold value) among the three adjacent cells is always limited to one cell, wave interference between the adjacent cells is decreased (S05 to S09). In the example shown in FIG. 6, as shown by shaded parts, a cell in which the reception power becomes equal to or larger than the second reception power threshold value is limited to a cell of the period 1. Therefore, wave interference between the adjacent cells during the period 2 and the period 3 is decreased.

In other words, the example shown in FIG. 6 assumes a concentration of plural terminals (equal to or above a prescribed number of terminals) in the cell edge (i.e., part two in FIG. 6). In this example, the base station of only one of the three adjacent cells communicates with a terminal positioned at the furthest are from the center of the cell. The base stations in the other two cells can communicate with terminals in the areas in which reception power is equal to or smaller than the second reception power threshold value (S10 and S12). Specifically, as shown in FIG. 6, out of the three adjacent cells, when only one cell is communicating in the range in which the reception power exceeds the second reception power threshold value (i.e., in the period 1 shown in FIG. 6), the other two adjacent cells communicate in the range in which the reception power is equal to or smaller than the second reception power threshold value (i.e., in the periods 2 and 3 shown in FIG. 6). As a result, wave interference between the adjacent cells can be decreased further.

When the number of terminals that are present near the cell edge is equal to or smaller than the prescribed number (part 1 in FIG. 5), each of the three adjacent cells repeats the normal operation (S10 and S11).

As described above, according to the present invention, a terminal positioned in the area furthest from the center of the cell can efficiently communicate at a high speed using a given frequency band without dividing the frequency band, by suppressing wave interference from terminals in adjacent cells.

What is claimed is:

1. A cellular mobile communication method that sequentially performs polling communication control to a plurality of terminals within a cell, based on a control of a base station positioned near a center of the cell, thereby making it possible to communicate between the terminals using a single frequency, wherein the base station generates a terminal attribute information table by obtaining terminal attribute information, including at least, a terminal name, reception power, a delay time and a reception direction therein, from the terminals at a start of communication, and sequentially performs the polling communication control of the terminals, starting from a terminal positioned nearest to the base station and ending with terminals positioned far from the base station, the base station uses the table and classifies an area of the cell, in which terminals are present, into three concentric areas including a first area that is nearest to the base station, a second area that is farther from the base station, and a third area that is furthest from the base station and is located at an edge of the cell, and each of other base stations of adjacent three cells sequentially increases transmission power from a center of a corresponding own cell towards an edge of said corresponding own cell, by shifting a phase by 120 degrees, synchronously with other cells, through communications between the base stations.

2. The cellular mobile communication method according to claim 1, wherein the base station provides a first threshold value in a boundary between the first area and the second area, provides a second threshold value in a boundary between the second area and the third area, and performs a communication start terminal control for increasing the transmission power in the adjacent three cells, by using pointers indicating a start point of the first area or the first or the second threshold value.

3. The cellular mobile communication method according to claim 2, wherein when a number of terminals within the third area exceeds a predetermined number, the base station limits only one cell to be engaged among the adjacent three cells, in which one cell, the number of terminals within the third area exceeds the predetermined number.

4. A base station for communicating with mobile terminals within one cell of a cellular mobile communication system organised as a plurality of mutually-adjacent cells, each of the cells being classified into three concentric areas including a first area that is nearest to the base station, a second area that is farther from the base station, and a third area that is furthest from the base station and is located at an edge of the one cell, and each of other base stations of adjacent three cells sequentially increasing transmission power from a center of a corresponding own cell towards an edge of said corresponding own cell, by shifting a phase by 120 degrees, synchronously with other cells, through communications between the base stations, the base station comprising:

a first unit configured to communicate with each of the mobile terminals within the one cell;

a second unit configured to classify the mobile terminals in terms of their distance from the base station by detecting signals received from each mobile terminal; and a third unit configured to coordinate with another base station in an adjacent cell to synchronize operations with the other base station;

wherein the base station is arranged to communicate with the mobile terminals classified as relatively distant from the base station at a same time as the other base station in the adjacent cell communicates with mobile terminals which are classified as relatively close to the other base station.

5. The base station of claim 4, wherein said second unit is operable to place the mobile terminals within the one cell in one of at least two classifications based on a threshold value of a received signal.

6. The base station of claim 5, wherein there are three classifications and said third unit is arranged to synchronize operations with other base stations in two adjacent cells so that communications with mobile terminals in respectively different ones of the three classifications are synchronized among the one cell and the two adjacent cells.

* * * * *